US012695087B2

(12) United States Patent
Takeshita et al.

(10) Patent No.: US 12,695,087 B2
(45) Date of Patent: Jul. 28, 2026

(54) METHOD FOR PRODUCING SILICON-BASED ACTIVE MATERIAL PARTICLES AND SILICON-BASED ACTIVE MATERIAL PRECURSOR PARTICLES

(71) Applicant: OSAKA Titanium technologies Co., Ltd., Hyogo (JP)

(72) Inventors: Kohki Takeshita, Nishinomiya (JP); Yusuke Kashitani, Nishinomiya (JP)

(73) Assignee: OSAKA Titanium technologies Co., Ltd., Hyogo (JP)

( * ) Notice: Subject to any disclaimer, the term of this patent is extended or adjusted under 35 U.S.C. 154(b) by 712 days.

(21) Appl. No.: 17/899,690

(22) Filed: Aug. 31, 2022

(65) Prior Publication Data

US 2022/0416234 A1     Dec. 29, 2022

Related U.S. Application Data

(63) Continuation of application No. 17/907,998, filed as application No. PCT/JP2021/010112 on Mar. 12, 2021.

(30) Foreign Application Priority Data

May 21, 2020     (JP) ................................. 2020-088789

(51) Int. Cl.
　*H01M 4/38*　　　(2006.01)
　*H01M 4/04*　　　(2006.01)
　*H01M 10/0525*　(2010.01)

(52) U.S. Cl.
　CPC ......... *H01M 4/386* (2013.01); *H01M 4/0421* (2013.01); *H01M 10/0525* (2013.01)

(58) Field of Classification Search
　CPC . H01M 4/386; H01M 4/0421; H01M 10/0525
　See application file for complete search history.

(56) References Cited

U.S. PATENT DOCUMENTS 2,352,195 A * 6/1944 Harcourt ............... F26B 17/286
　　　　　　　　　　　　　　　　　　　　　34/67
5,096,685 A 　 3/1992 Funahashi et al.
　　　　　　(Continued)

FOREIGN PATENT DOCUMENTS

CN 　 101764221 A 　 6/2010
CN 　 109524650 A 　 3/2019
　　　　　(Continued)

OTHER PUBLICATIONS

Non-final Office Action from the United States Patent and Trademark Office for U.S. Appl. No. 17/907,998 on Mar. 20, 2025.
(Continued)

*Primary Examiner* — Maria Laios
*Assistant Examiner* — Lawrence La Raia, III
(74) *Attorney, Agent, or Firm* — Millen, White, Zelano & Branigan, P.C.; Christopher W. Brody

(57) ABSTRACT

A method for producing a silicon-based active material precursor particle includes a laminated coating forming step for forming a laminated coating of a silicon-based active material on a substrate by repeating a vapor deposition step for depositing a silicon-based active material forming material on the substrate to form the silicon-based active material forming material having a multilayer structure. Following the laminated coating step, the method includes a scraping step for scraping off the laminated coating of the silicon-based active material from the substrate after repeating the vapor deposition step to obtain the silicon-based active material precursor particle having the multilayer structure as a part thereof. The substrate can be a rotating body having a horizontal axis for repeating the vapor deposition step or be one that is relatively movable with respect to the supply path of the silicon-based active material for repeating the vapor deposition step.

2 Claims, 9 Drawing Sheets

(56) References Cited

U.S. PATENT DOCUMENTS

| | | | |
|---|---|---|---|
| 2001/0012503 A1* | 8/2001 | Fukuoka | H01M 4/485 |
| | | | 118/725 |
| 2003/0150377 A1 | 8/2003 | Arimoto et al. | |
| 2007/0037465 A1* | 2/2007 | Nutz | C23C 28/00 |
| | | | 442/376 |
| 2007/0259113 A1 | 11/2007 | Kizaki et al. | |
| 2010/0159337 A1 | 6/2010 | Matsumoto et al. | |
| 2016/0172665 A1* | 6/2016 | Zhou | H01M 4/0402 |
| | | | 429/337 |

FOREIGN PATENT DOCUMENTS

| | | |
|---|---|---|
| JP | 05-290833 | 11/1993 |
| JP | 2008-293872 | 12/2008 |
| JP | 2009-110798 | 5/2009 |
| JP | 2010-147005 | 7/2010 |
| JP | 2012-033280 | 2/2012 |
| JP | 2019-067644 | 4/2019 |
| WO | 2020/045333 | 3/2020 |

OTHER PUBLICATIONS

United States Patent and Trademark Office Final Office Action issued Aug. 7, 2025 in the corresponding U.S. Appl. No. 17/907,998.
United States Office Action dated Feb. 19, 2026 issued in corresponding U.S. Appl. No. 17/907,998.

* cited by examiner

METHOD FOR PRODUCING SILICON-BASED ACTIVE MATERIAL PARTICLES AND SILICON-BASED ACTIVE MATERIAL PRECURSOR PARTICLES

TECHNICAL FIELD

The present invention relates to a silicon-based active material particle. The present invention also relates to a silicon-based active material precursor particle and a method for producing the same.

BACKGROUND OF THE INVENTION

Various silicon oxide-based active material particles used for forming negative electrodes of lithium secondary batteries have been proposed in the past (see, for example, Japanese Unexamined Patent Application Publication No. 2019-67644).

PRIOR ART DOCUMENTS

Patent Document

[PATENT DOCUMENT 1] Japanese Unexamined Patent Application Publication No. 2019-67644

SUMMARY OF THE INVENTION

Problem to be Solved by the Invention

Incidentally, in recent years, there has been a demand for an improvement in the ability of the active material particles to take in ions such as lithium ions.

An object of the present invention is to provide active material particles excellent in ion uptake ability.

Means for Solving the Problem

The silicon-based active material particles according to the first aspect of the present invention comprise a layer structure. Here, the "silicon-based active material particles" are, for example, active material particles for forming a negative electrode of a lithium ion secondary battery. Examples of the active material particles for forming the negative electrode of the lithium ion secondary battery include so-called Si-based active materials such as silicon (Si), silicon oxide ($SiO_x$), metal element-containing silicon oxide containing alkaline metal elements such as lithium (Li) and alkaline earth metal elements such as magnesium (Mg), silicon alloys. The thickness of the layer in the silicon-based active material particles is preferably 1 μm or less. The thickness of the layer is preferably 0.01 μm or more from the viewpoint of preventing the initial efficiency and the capacity from being undersized.

As described above, the silicon-based active material particles comprise a layer structure. In the silicon-based active material particles, oxygen is concentrated in a layered form. The oxygen element (O) of the silicon oxide ($SiO_x$) reacts with the lithium (Li) by charging to produce lithium silicate, and the lithium silicate is highly lithium conductive. Therefore, in the silicon-based active material particles, a region having high lithium conductivity is present in a layered form, and lithium can move smoothly therein. As a result, when the silicon-based active material particles are used as the negative electrode active material, the silicon-based active material particles are superior in ion uptake ability as compared with conventional silicon-based active material particles having no layer structure, and thus the output characteristics of batteries such as lithium secondary batteries and the like can be improved.

The silicon-based active material precursor particles according to the second aspect of the present invention comprise a layer structure. The "silicon-based active material precursor particles" referred to herein are those that are pulverized to form silicon-based active material particles, and are, for example, silicon-based active material precursor particles for forming a negative electrode of a lithium ion secondary battery. Examples of the active material particles for forming the negative electrode of the lithium ion secondary battery include so-called Si-based active materials such as silicon (Si), silicon oxide ($SiO_x$), metal element-containing silicon oxide containing alkaline metal elements such as lithium (Li) and alkaline earth metal elements such as magnesium (Mg), silicon alloys. The thickness of the layer in the silicon-based active material precursor particles is preferably 1 μm or less. Here, the thickness of the layer is preferably 0.01 μm or more.

As described above, the silicon-based active material precursor particles comprise a layer structure. Therefore, when the silicon-based active material precursor particles are pulverized, fracture is likely to occur starting from the surface of the layer. Therefore, the silicon-based active material precursor particles can produce silicon-based active material particles with less energy than silicon-based active material precursor particles having no layer structure. In the case where the silicon-based active material particles obtained as described above have a layer structure, the silicon-based active material particles can exhibit the same effects as those of the silicon-based active material particles according to the first aspect.

A method for producing a silicon-based active material precursor particle having a layer structure according to a second aspect of the present invention comprises a laminated coating forming step and a scraping step. In the laminated coating forming step, a deposition step in which a silicon-based active material forming material is deposited on a substrate is repeatedly performed to form a laminated coating of a silicon-based active material on the substrate. The base body is preferably a rotating body having an axis along the horizontal direction or a plate body capable of moving relative to a supply path of the silicon-based active material forming material. In the scraping step, the laminated coating of the silicon-based active material is scraped off.

Therefore, in the method for producing the silicon-based active material precursor particles, the bonding force between the layers of the laminated coating of the silicon-based active material can be adjusted by adjusting the temperature and the like of the substrate. Therefore, in this method, the pulverization property of the obtained silicon-based active material precursor particles can be adjusted, and in the case where the silicon-based active material particles having a layer structure are obtained from the silicon-based active material precursor particles, the ion uptake ability of the silicon-based active material particles can be adjusted.

EXPLANATION OF REFERENCE SYMBOLS

Figure 1:
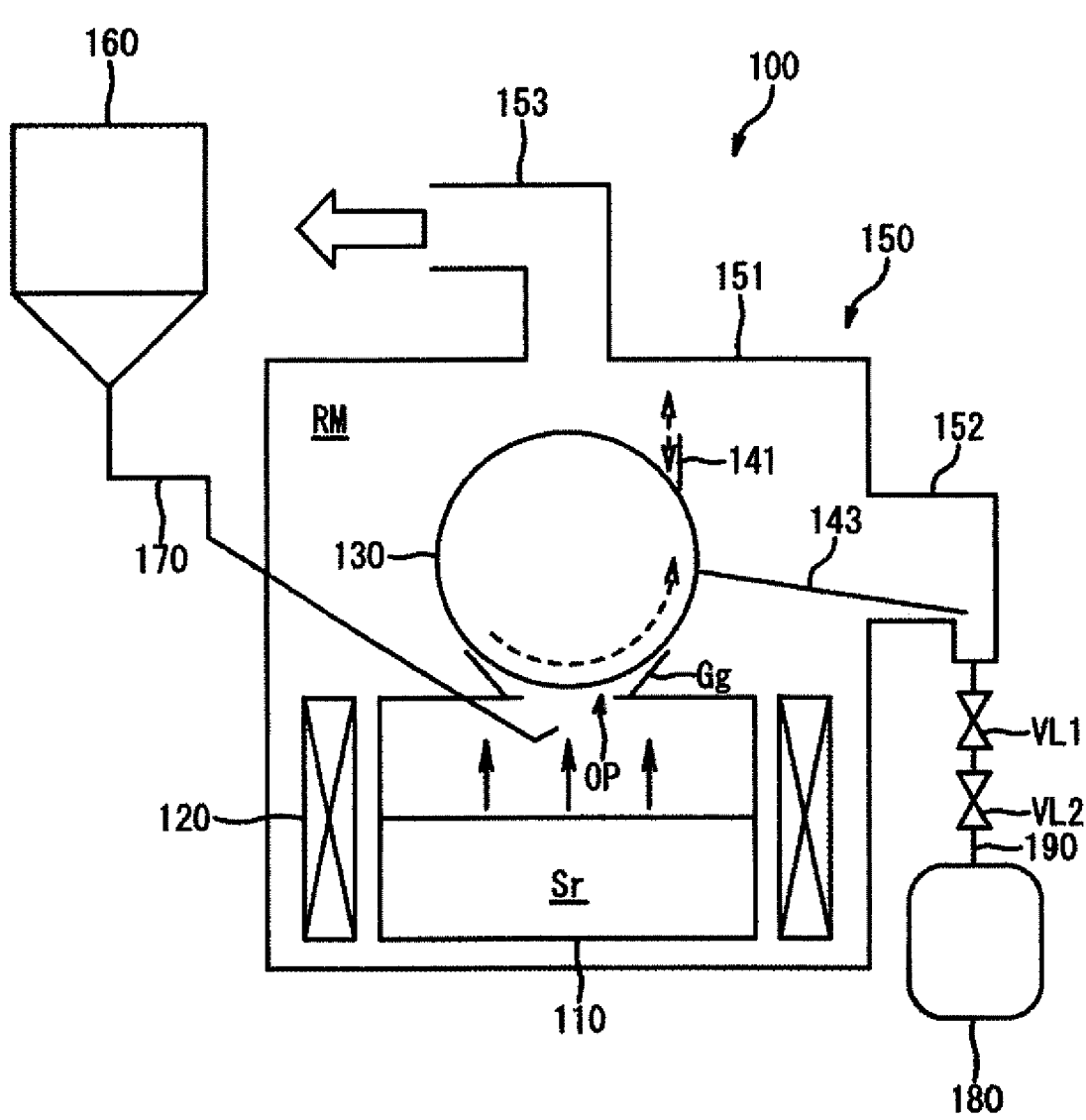
FIG. 1 It is a schematic diagram of a manufacturing apparatus of the silicon-based active material precursor particles according to the embodiment of the present invention.
Figure 2:
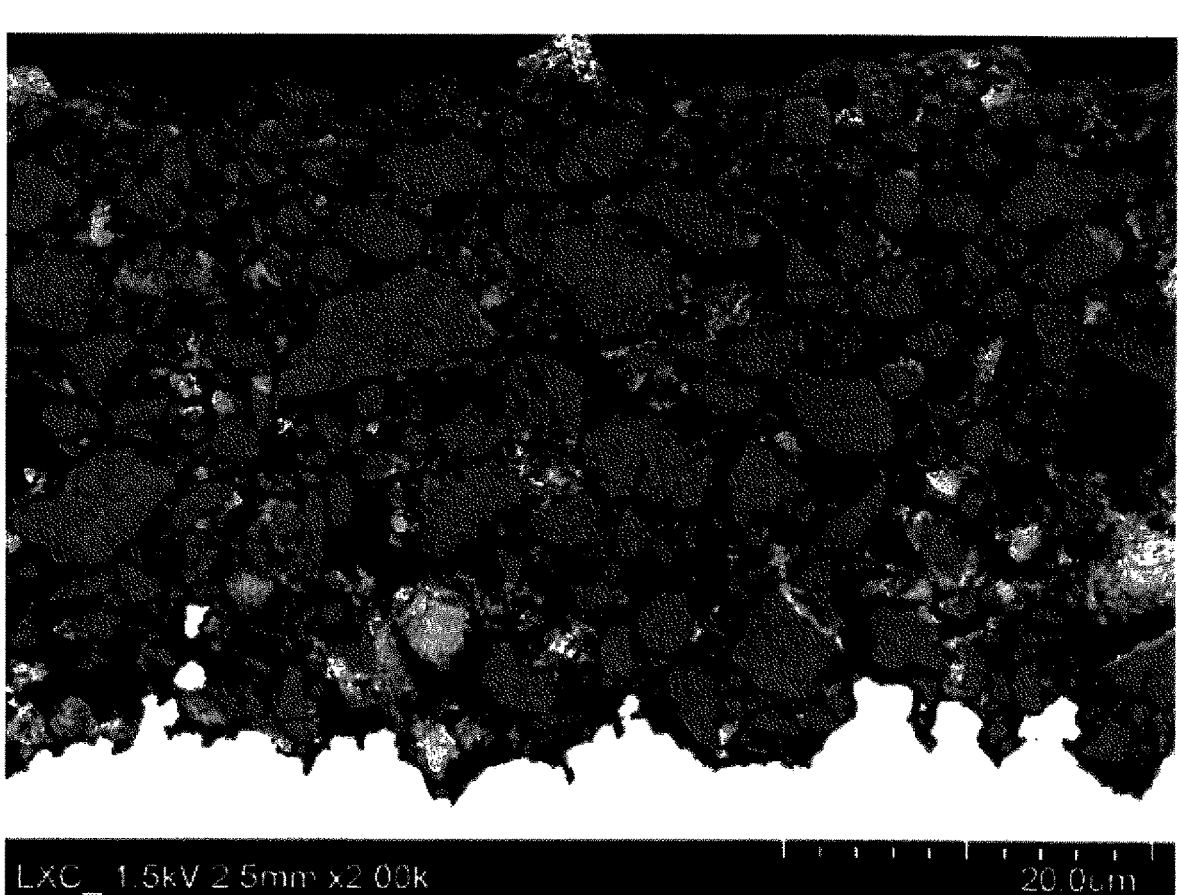
FIG. 2 It is an SEM image at 2,000 magnification of a negative electrode according to working example 1.
Figure 3:
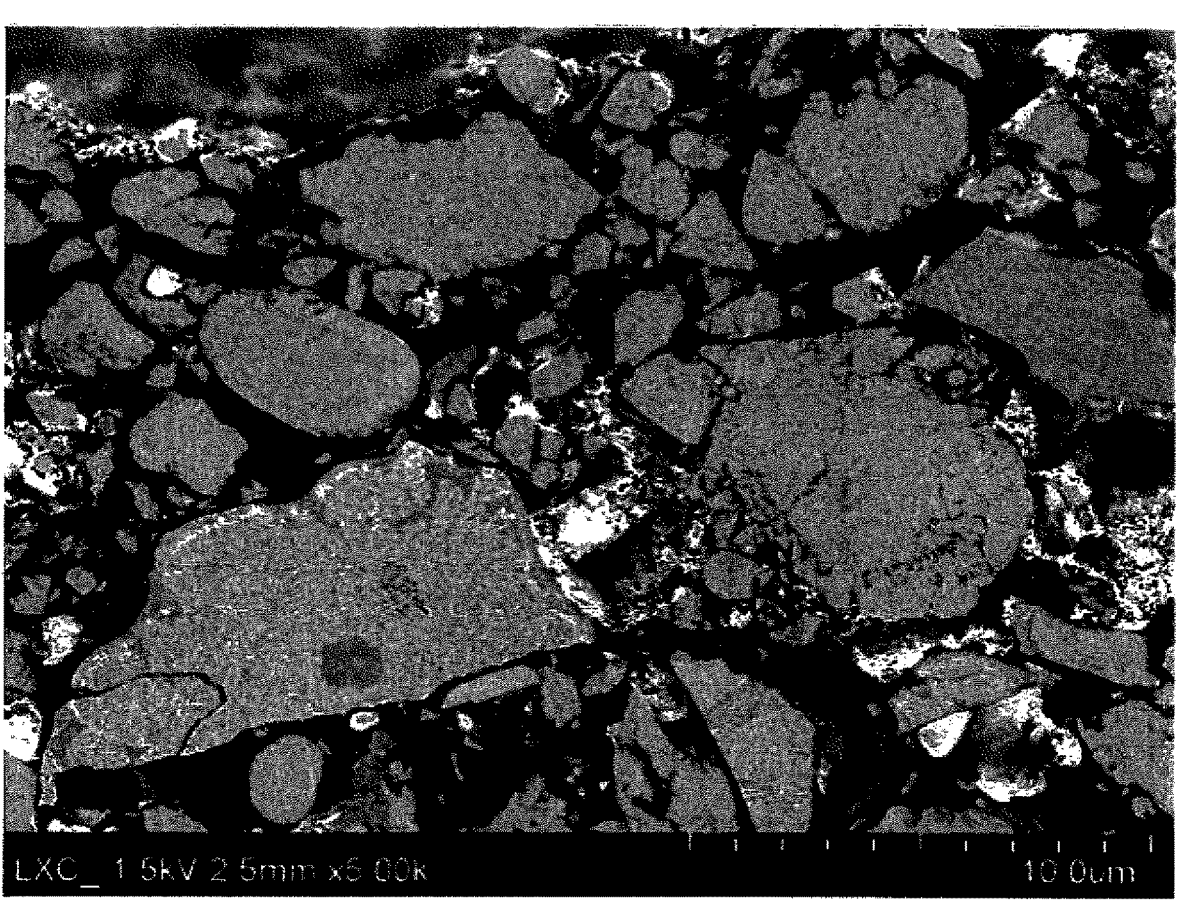
FIG. 3 It is an SEM image at 5,000 magnification of a negative electrode according to working example 1.
Figure 4:
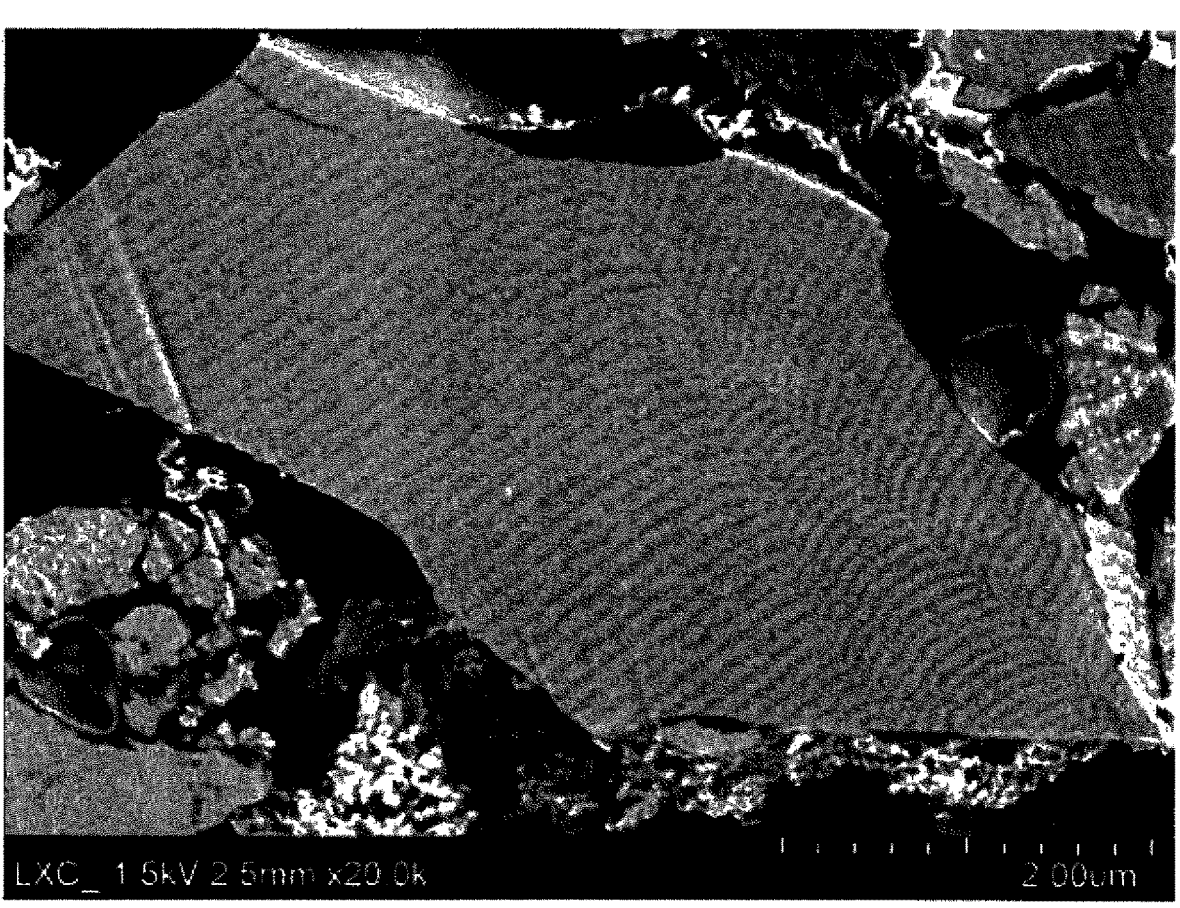
FIG. 4 It is an SEM image at 20,000 magnification of a negative electrode according to working example 1.
Figure 5:
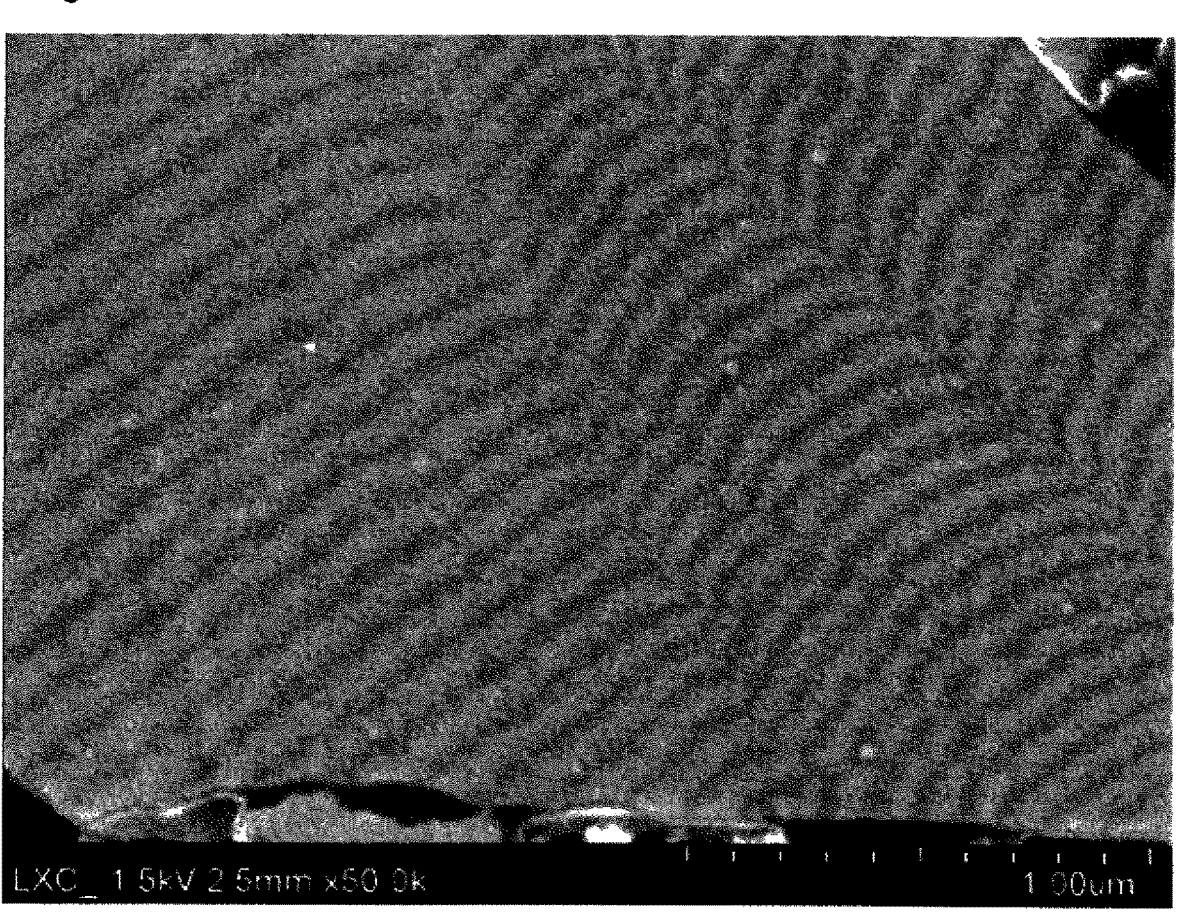
FIG. 5 It is an SEM image at 50,000 magnification of a negative electrode according to working example 1.
Figure 6:
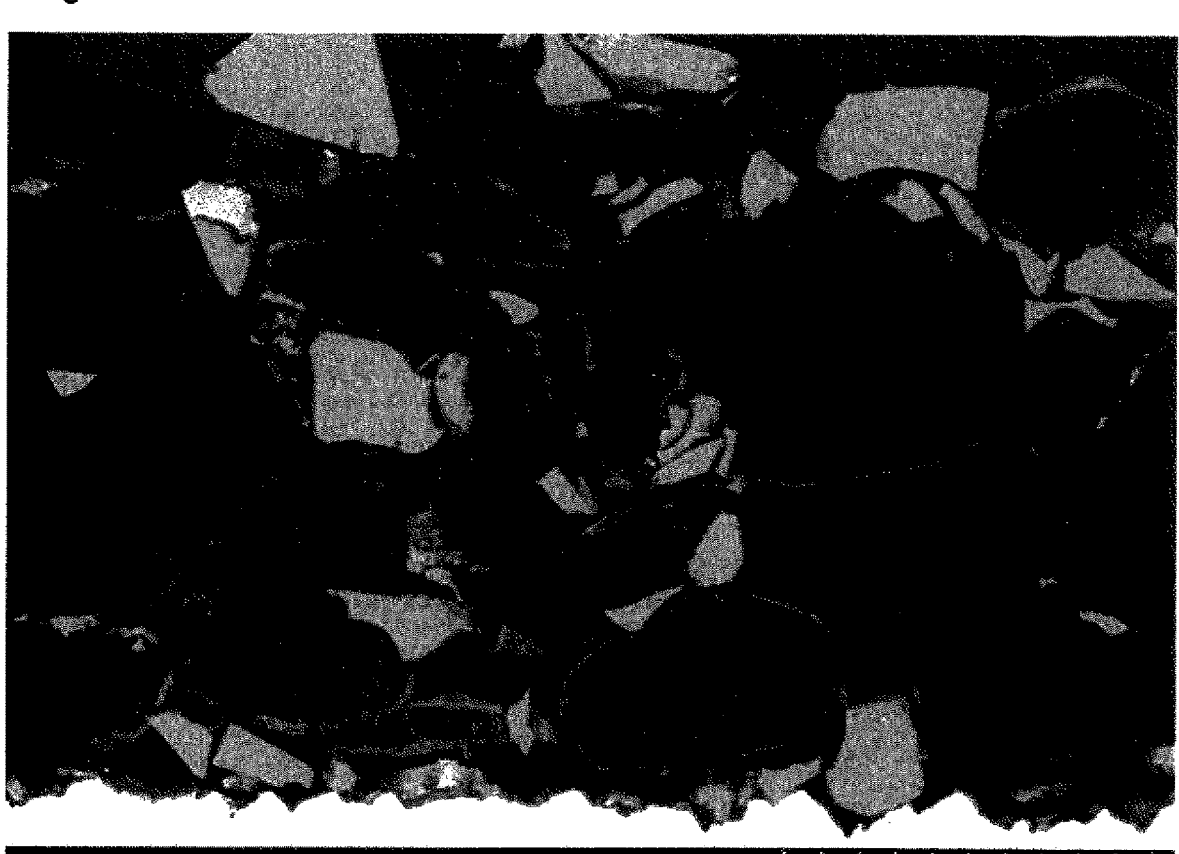
FIG. 6 It is an SEM image at 2,000 magnification of a negative electrode according to comparative Example 1.
Figure 7:
FIG. 7 It is an SEM image at 5,000 magnification of a negative electrode according to comparative Example 1.
Figure 8:
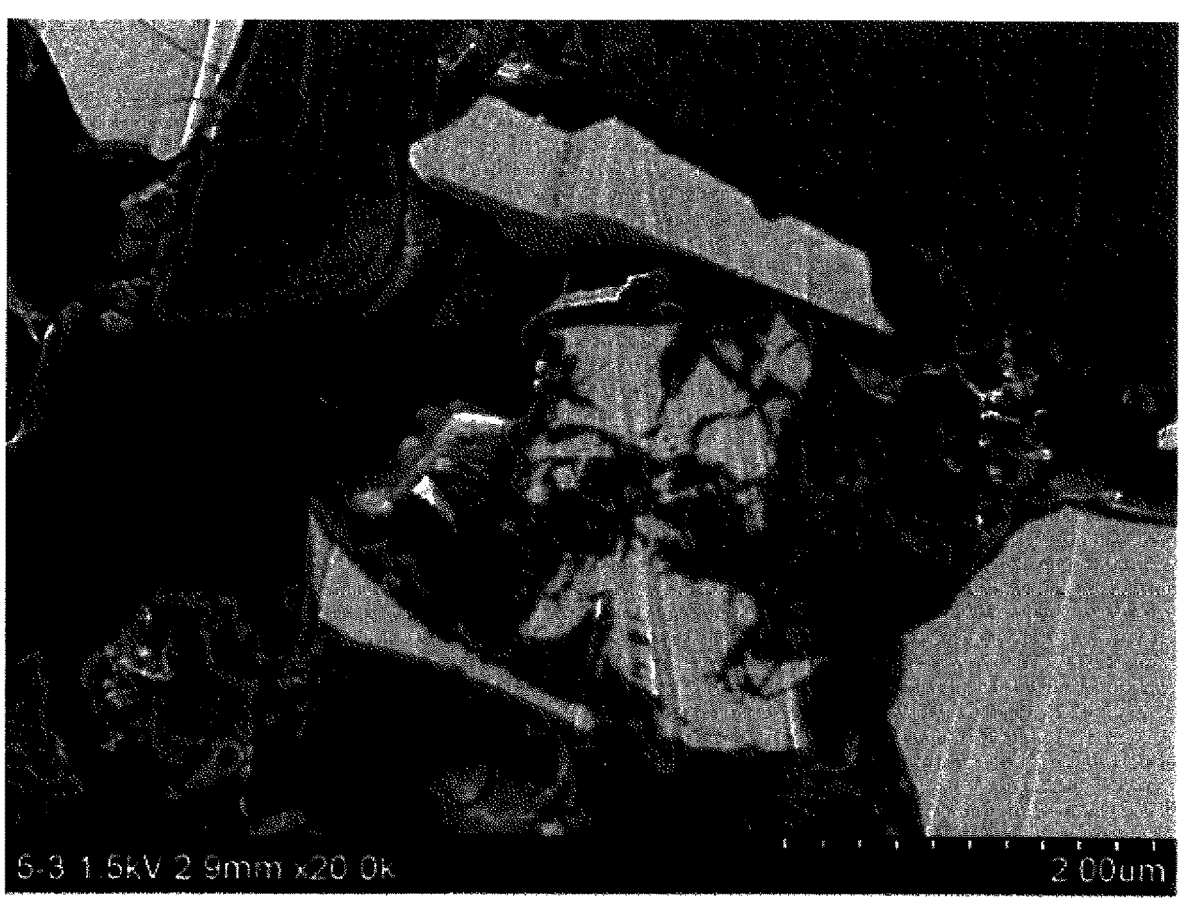
FIG. 8 It is an SEM image at 20,000 magnification of a negative electrode according to comparative Example 1.
Figure 9:
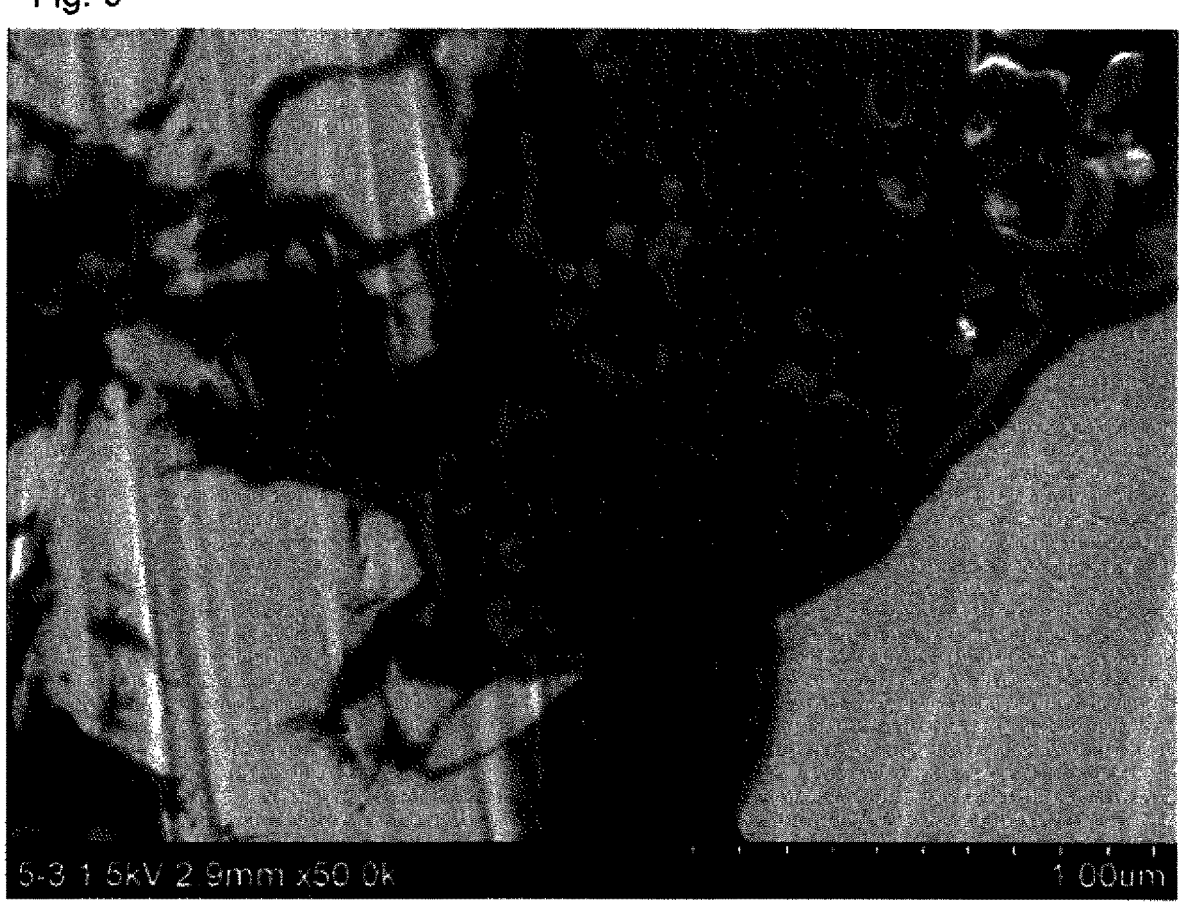
FIG. 9 It is an SEM image at 50,000 magnification of a negative electrode according to comparative Example 1.

100 Vapor deposition apparatus
110 Crucible
120 Heater
130 Deposition drum
141 Scraper
143 Particle guide
150 Chamber
151 Chamber body portion
152 Collection portion
153 Exhaust pipe
160 Raw material supply hopper
170 Raw material introduction pipe
180 Collection container
190 Collection pipe
Gg Gas Guide
OP opening
RM deposition chamber
Sr molten metal
VL1 first valve
VL2 second valve

MODE FOR CARRYING OUT THE INVENTION

The silicon-based active material precursor particles according to the embodiment of the present invention are pulverized to form silicon-based active material particles, and have a layer structure (multilayer structure). Such silicon-based active material precursor particles are, for example, precursor particles of silicon (Si), silicon oxide ($SiO_x$), metal element-containing silicon oxide containing an alkaline metal element such as or lithium (Li) or an alkaline earth metal element such as magnesium (Mg), a silicon alloy used as an active material of a negative electrode of a lithium-ion secondary battery. In addition, the silicon-based active material precursor particles according to the present embodiment are pulverized to a predetermined particle size to form silicon-based active material particles for forming an electrode (particularly, a negative electrode). In addition, it is preferable that the thickness of the layer is 1 μm or less, that it is 0.5 μm or less is preferable, that it is 0.2 μm or less is even more preferable, that it is 0.1 μm or less is even more preferable, and that it is 0.05 μm or less is even more preferable, and that it is 0.02 μm or less is particularly preferable in the silicic active material particles. The thickness of the layer is preferably 0.01 μm or more from the viewpoint of preventing the initial efficiency and the capacity of the battery from being undersized.

Incidentally, such silicon-based active material precursor particles can be obtained, for example, by forming a laminated coating on a substrate and then scraping the laminated coating from the substrate. it is preferable to manufacture the silicon-based active material precursor particles by using the vapor deposition apparatus 100 as shown in FIG. 1 from the viewpoint of suppressing manufacturing costs and the like. Hereinafter, the vapor deposition apparatus 100 shown in FIG. 1 will be described in detail.

As shown in FIG. 1, the vapor deposition apparatus 100 mainly includes a crucible 110, a heater 120, a vapor deposition drum 130, a scraper 141, a particle guide 143, a chamber 150, a raw material supply hopper 160, a raw material introduction pipe 170, a collection container 180, a first valve VL1, and a second valve VL2.

As shown in FIG. 1, the crucible 110 is a heat-resistant container in which a central portion of a top wall is opened, and is installed in the chamber 150. Further, a through hole (not shown) is formed in one portion of the peripheral portion of the top wall of the crucible 110, the raw material introduction pipe 170 is inserted into the through hole. That is, the raw material in the raw material supply hopper 160 is supplied to the crucible 110 through the raw material introduction pipe 170. A gas guide Gg is disposed above the top wall of the crucible 110. The gas guide Gg is a member that guides the source gas generated in the crucible 110 to the vapor deposition drum 130, and is installed on the upper surface of the top wall so as to surround the central portion of the top wall as shown in FIG. 1.

The heater 120 is for heating the crucible 110 at a high temperature, and is arranged to take in the outer periphery of the crucible 110.

The vapor deposition drum 130 is, for example, a cylindrical horizontal drum, and as shown in FIG. 1, is disposed above the opening OP of the top wall of the crucible 110, and a lower portion thereof is surrounded by the gas guide Gg. The vapor deposition drum 130 is driven to rotate in one direction by a driving mechanism (not shown). The vapor deposition drum 130 is provided with a temperature controller (not shown) for keeping the outer peripheral surface at a constant temperature. The temperature controller cools the outer peripheral surface temperature of the vapor deposition drum 130 to a temperature suitable for vapor deposition of the vapor deposition source gas by a cooling medium supplied from the outside. Also, the outer peripheral surface temperature of the vapor deposition drum 130 may affect the crystallinity of the deposit s deposited on the deposit s remaining on the deposition drum. If the temperature is too low, the structure of the deposit may become too sparse, and if the temperature is too high, crystal growth due to the disproportionation reaction may proceed. When the source gas is SiO gas, the temperature is preferably 900° C. or lower, more preferably 150° C. or higher and 800° C. or lower, and particularly preferably 150° C. or higher and 700° C. or lower. In addition, the thickness of the layer constituting the silicon-based active material precursor particles can be controlled by adjusting the rotation speed and the temperature of the outer peripheral surface of the vapor deposition drum 130.

The scraper 141 is a member that serves to scrape the laminated coating formed on the vapor deposition drum from the vapor deposition drum 130, and is disposed in the vicinity of the vapor deposition drum 130 so as to be movable up and down as shown in FIG. 1. This scraper 141 is placed in a standby state in the upper side during the formation of the laminated coating, and is moved downward to scrape off the laminated coating when the formation of the laminated coating is completed. Note that the scraped-off laminated coating pieces (silicon-based active material precursor particles) fall to the particle guide 143. Further, the material of the scraper 141 affects impurity contamination of the silicon-based active material particles. From the viewpoint of suppressing the influence thereof, the material of the scraper 141 is preferably stainless steel or ceramics, and particularly preferably ceramics. In addition, the scraper 141 is preferably not in contact with the outer peripheral surface of the vapor deposition drum 130. This is because it is possible to prevent impurity contamination that may be caused by direct contact between the vapor deposition drum 130 and the scraper 141 from being mixed into the collected silicon-based active material precursor particles.

The particle guide 143 is, for example, a vibration-type transport member, and as shown in FIG. 1, is disposed so as to incline downward from the vicinity of the vapor deposition drum toward the collection portion 152 of the chamber 150, and receives the laminated coating pieces scraped off by the scraper 141 disposed above the particle guide, and delivers the laminated coating pieces to the collection portion 152 of the chamber 150.

As shown in FIG. 1, the chamber 150 is mainly formed of a chamber body portion 151, a collection portion 152, and an exhaust pipe 153. As shown in FIG. 1, the chamber body portion 151 is a box-shaped portion having a deposition chamber RM therein, and accommodates a crucible 110, a heater 120, a vapor deposition drum 130, a scraper 141, and a particle guide 143. As shown in FIG. 1, the collection portion 152 is the portion that protrudes outward from the side wall of the chamber body portion 151 and has a space that communicates with the deposition chamber RM of the chamber body portion 151. As described above, the tip portion of the particle guide 143 is positioned in the collection portion 152.

The raw material supply hopper 160 is a raw material supply source and has an outlet connected to the raw material introduction pipe 170 as shown in FIG. 1. That is, the raw material supplied to the raw material supply hopper 160 is supplied to the crucible 110 through the raw material introduction pipe 170 at an appropriate timing. Note that the raw material supplied to the crucible 110 is vaporized to become the raw material gas after becoming the molten metal Sr.

The raw material introduction pipe 170 is a round hole-shaped nozzle for supplying the solid raw material supplied to the raw material supply hopper 160 to the crucible 110, and is arranged so as to orient opening upward in a central portion of a top plate portion of the crucible 110.

The collection container 180 is a container for collecting the laminated coating pieces that have passed through the first valve VL1 and the second valve VL2.

The first valve VL1 and the second valve VL2 are provided in a collection pipe 190 that connects the collection portion 152 of the chamber 150 and the collection container 180 to adjust the collection quantity of the laminated coating pieces to the collection container 180 by opening and closing.

Hereinafter, a case where a silicon oxide powder or a metal element-containing silicon oxide powder used for a negative electrode material for a lithium ion secondary battery is manufactured using the above-described vapor deposition apparatus 100 will be described.

The raw material is fed from the raw material supply hopper 160 to the crucible 110 via the raw material introduction pipe 170. Here, when the silicon oxide particles are produced, a mixed powder of Si and $SiO_2$ is used as a raw material. The mixed particles are heated to a predetermined temperature to generate SiO gas as a raw material gas. When the metal element-containing silicon oxide powder is produced, a mixed particle of Si and a silicate such as $Li_2Si_2O_5$, a carbonate such as lithium carbonate ($Li_2CO_3$), a mixed powder of silicon dioxide ($SiO_2$) and silicon (Si), or the like is used as a raw material. In such a case, the mixed particles are heated to a predetermined temperature to generate SiO gas containing a metal element such as Li as a raw material gas. The metal element may be an element capable of reducing SiO and stabilizing oxygen, such as an alkali metal such as Na, an alkaline earth metal such as Mg or Ca, in addition to Li.

When the raw material is charged into the crucible 110, the crucible 110 is heated by the heater 120 while the pressure in the deposition chamber RM is reduced. If the pressure in the deposition chamber RM is too high, a reaction in which SiO gas is generated from the raw material is unlikely to occur. Therefore, the pressure in the deposition chamber RM is preferably 100 Pa or less, more preferably 750 Pa or less, and particularly preferably 20 Pa or less. Further, the temperature in the deposition chamber RM affects the reaction rate of SiO, the reaction rate becomes slow when the same temperature is too low, the side reaction progress due to melting of the raw material if the same temperature is too high, there is a concern such as energy efficiency decrease. Also, there is a concern that the crucible 110 may be damaged at the same temperature. From this viewpoint, the temperature in the deposition chamber RM is preferably in the range of 1000° C. or higher and 1600° C. or lower, more preferably in the range of 1100° C. or higher and 1500° C. or lower, particularly preferably in the range of 1100° C. or higher and 1400° C. or lower.

By heating the raw material under reduced pressure as described in the above paragraph, the raw material gas is generated from the raw material in the crucible 110, and the raw material gas is supplied to the vapor deposition drum 130 through the gas guide Gg. At this time, the vapor deposition drum 130 is rotationally driven by a driving source. The temperature of the outer peripheral surface of the vapor deposition drum 130 is set to be lower than the temperature in the deposition chamber RM. More specifically, the same temperature is set lower than the condensation temperature of the raw material gas. By this setting, the raw material gas generated from the crucible 110 is deposited on the outer peripheral surface of the rotating vapor deposition drum 130. Then, the vapor deposition drum 130 is rotated a plurality of times to form a laminated coating on the vapor deposition drum 130 while the scraper 141 is placed in a standby state on the upper side. After that, when the number of revolutions of the vapor deposition drum 130 reaches a predetermined number, the scraper 141 is moved downward, and the laminated coating is scraped off from the vapor deposition drum 130 by the scraper 141. Note that the scraped-off laminated coating pieces fall along the outer peripheral surface of the vapor deposition drum 130 to the particle guide 143.

In the vapor deposition apparatus 100 of the present embodiment, high-quality silicon-based active material precursor particles are produced as described above.

Hereinafter, working examples and comparative examples are shown in order to explain the present invention in more detail, but the present invention is not limited to these examples.

Working Example 1

1. Preparation of Silicon-Based Active Material Powder

A crucible 110 of the vapor deposition apparatus 100 shown in FIG. 1 is charged with a mixed powder of a powder of silicon (Si) and a powder of silicon dioxide ($SiO_2$) as a silicon monoxide (SiO) gas generation raw material (It is a powder produced by mixing the powder of silicon and a powder of silicon dioxide so as to be Si:O=1:1), the deposition chamber RM is reduced in pressure to 1 Pa and the crucible 110 is heated to 1300° C. to generate silicon monoxide gas. On the other hand, the vapor deposition drum 130 was rotated while controlling the temperature so that the outer peripheral surface temperature of the vapor deposition drum 130 was 150° C., and the silicon monoxide gas was condensed and deposited on the outer peripheral surface of the vapor deposition drum 130. At this time, the rotation speed of the vapor deposition drum 130 was adjusted so that silicon monoxide was deposited on the outer peripheral surface of the vapor deposition drum 130 with a thickness of 0.18 μm while the vapor deposition drum 130 was rotated once. Then, after the vapor deposition drum 130 was rotated 50 times, the scraper 141 was brought close to the vapor deposition drum 130, and the silicon monoxide thin coating deposited (laminated) on the outer peripheral surface of the vapor deposition drum 130 was scraped off to obtain a silicon monoxide powder. Thereafter, the silicon monoxide powder was heat-treated at 700° C. in an argon atmosphere to obtain a silicon-based active material precursor powder. Then, the silicon-based active material precursor powder was subjected to a pulverizer to refine, and then the silicon-based active material precursor powder was sieved through a sieve having an opening of 20 μm and passed through a sieve to obtain a silicon-based active material powder.

2. Measurement of Pulverization Characteristics of Silicon-Based Active Material Precursor Powder The silicon-based active material precursor powder was sifted with a double sieve formed by superposing a sieve having an opening of 45 μm on a sieve having an opening of 20 μm, and the powder that passed through the sieve having an opening of 45 μm but did not pass through the sieve having an opening of 20 μm (i.e., that left on the sieve having an opening of 20 μm) was used as a pulverized sample for measuring pulverization characteristics. Then, the pulverized sample having a bulk of IL was filled into a dry attritor MAID (dry attritor) manufactured by Nippon Coke Co., Ltd., and the attritor was operated for 5 minutes. At this time, using a zirconia sphere having a diameter of 5 mm as a ball for grinding, the rotational speed of the attritor was set to 300 rpm. Then, the particle size distribution of the pulverized sample pulverized for 5 minutes in an attritor was measured using a Mastersizer2000 manufactured by Malvern (laser diffractive particle size distribution measuring device), to determine the volume-based median diameter D50 (hereinafter referred to as "mean particle diameter"). The measurement results are shown in Table 1. In the particle size distribution measurement, isopropyl alcohol was used as a solvent.

3. Electrode Characterization of Silicon-Based Active Material Powder (1) Preparation of Negative Electrode and SEM Observation The silicon-based active material powder (SiO powder), Ketjen black, and a polyimide precursor that is a non-aqueous binder were mixed at a weight ratio of 85:5:10, and after adding N-methylpyrrolidone to the mixture, the mixture was kneaded to prepare a slurry. Then, the slurry was coated on a copper foil having a thickness of 40 μm, the coating was preliminarily dried at 80° C. for 15 minutes, and then the copper foil with a dry coating was punched out to a diameter of 11 mm, and then heated at 350° C. under reduced pressure to prepare a negative electrode. By heating the copper foil with a dry coating at 350° C., the polyimide precursor in the dry coating is imidized. The negative electrode was imaged by a scanning electron microscope (SEM) to obtain the images shown in FIGS. 2 to 5. From these images, it was confirmed that the silicon-based active material particles in the silicon-based active material powder had a layer structure, and that the thickness of each layer was 0.2 μm or less.

The thickness of the layer was determined as follows. First, a line segment vertically straddling the layers was drawn with respect to any 10 layers among a plurality of layers appearing as a stripe pattern (striped grains in an SEM image) in an SEM image at 50,000 magnifications the cross section of the silicon-based active material particles of one particle, and the length of the line segment divided by 10 was defined as the thickness of the layer of the silicon-based active material particles. Then, the operation was performed on the SEM image of 50,000 magnifications the cross-section of the ten silicon-based active material particles, and the average thickness of the layers in the ten silicon-based active material particles was defined as the thickness of the final silicon-based active material particles.

(2) Preparation of Coin Cell (Lithium Ion Secondary Battery) and Measurement of Battery Properties A coin cell was produced using a lithium foil as a counter electrode and using "a solution in which phosphorus lithium hexafluoride was dissolved in a solution in which ethylene carbonate and diethyl carbonate were mixed in a volume ratio of 1:1 so that phosphorus lithium hexafluoride ($LiPF_6$) became a concentration of 1 mol/L" as an electrolyte, and using a polyethylene porous film having a thickness of 20 μm as a separator.

The coin cell was charged and discharged using a secondary battery charge and discharge test apparatus manufactured by Electrofield Corporation. The test conditions in the charge-discharge test were as shown in Table 2. By this charge-discharge test, the initial charge capacity, the initial discharge capacity, the ratio of the initial discharge capacity to the initial charge capacity (initial Coulomb efficiency), and the ratio of the third discharge capacity to the initial discharge capacity (output characteristics) were determined. The measurement results were as shown in Table 1. Here, the "output characteristics" refers to a ratio of the "discharge capacity at the time of charging and discharging in the third cycle 0.5C" to the "discharge capacity at the time of charging and discharging in the first 0.1C".

Working Example 2

The silicon-based active material powder was prepared in the same manner as in the working example 1 except that the rotation speed of the vapor deposition drum 130 was adjusted so that the deposition thickness of silicon monoxide became 0.98 μm, and the pulverization characteristics of the silicon-based active material precursor powder and the electrode characteristics of the silicon-based active material powder were measured. The measurement results were as shown in Table 1. Also in this working example, a negative electrode was prepared in the same manner as in the working example 1, and the negative electrode was imaged by a scanning electron microscope (SEM), and it was confirmed from the image that the silicon-based active material particles in the silicon-based active material powder had a layer structure, and that the thickness of each layer was 1 μm or less.

Working Example 3

The silicon-based active material powder was prepared in the same manner as in the working example 1 except that the rotation speed of the vapor deposition drum 130 was adjusted so that the deposition thickness of silicon monoxide became 0.48 μm, and the pulverization characteristics of the silicon-based active material precursor powder and the electrode characteristics of the silicon-based active material powder were measured. The measurement results were as shown in Table 1. Also in this working example, a negative electrode was prepared in the same manner as in the working example 1, and the negative electrode was imaged by a scanning electron microscope (SEM), and it was confirmed from the image that the silicon-based active material particles in the silicon-based active material powder had a layer structure, and that the thickness of each layer was 0.5 μm or less.

Working Example 4

The silicon-based active material powder was prepared in the same manner as in the working example 1 except that the rotation speed of the vapor deposition drum 130 was adjusted so that the deposition thickness of silicon monoxide became 0.08 μm, and the pulverization characteristics of the silicon-based active material precursor powder and the electrode characteristics of the silicon-based active material powder were measured. The measurement results were as shown in Table 1. Also in this working example, a negative electrode was prepared in the same manner as in the working example 1, and the negative electrode was imaged by a scanning electron microscope (SEM), and it was confirmed from the image that the silicon-based active material particles in the silicon-based active material powder had a layer structure, and that the thickness of each layer was 0.1 μm or less.

Working Example 5

The silicon-based active material powder was prepared in the same manner as in the working example 1 except that the rotation speed of the vapor deposition drum 130 was adjusted so that the deposition thickness of silicon monoxide became about 0.05 μm, and the pulverization characteristics of the silicon-based active material precursor powder and the electrode characteristics of the silicon-based active material powder were measured. The measurement results were as shown in Table 1. Also in this working example, a negative electrode was prepared in the same manner as in the working example 1, and the negative electrode was imaged by a scanning electron microscope (SEM), and it was confirmed from the image that the silicon-based active material particles in the silicon-based active material powder had a layer structure, and that the thickness of each layer was about 0.05 μm.

Working Example 6

The silicon-based active material powder was prepared in the same manner as in the working example 1 except that the rotation speed of the vapor deposition drum 130 was adjusted so that the deposition thickness of silicon monoxide became about 0.02 μm, and the pulverization characteristics of the silicon-based active material precursor powder and the electrode characteristics of the silicon-based active material powder were measured. The measurement results were as shown in Table 1. Also in this working example, a negative electrode was prepared in the same manner as in the working example 1, and the negative electrode was imaged by a scanning electron microscope (SEM), and it was confirmed from the image that the silicon-based active material particles in the silicon-based active material powder had a layer structure, and that the thickness of each layer was about 0.02 μm.

Working Example 7

The silicon-based active material powder was prepared in the same manner as in the working example 1 except that the rotation speed of the vapor deposition drum 130 was adjusted so that the deposition thickness of silicon monoxide became about 0.01 μm, and the pulverization characteristics of the silicon-based active material precursor powder and the electrode characteristics of the silicon-based active material powder were measured. The measurement results were as shown in Table 1. Also in this working example, a negative electrode was prepared in the same manner as in the working example 1, and the negative electrode was imaged by a scanning electron microscope (SEM), and it was confirmed from the image that the silicon-based active material particles in the silicon-based active material powder had a layer structure, and the thickness of each layer was about 0.01 μm.

Working Example 8

A silicon-based active material powder was prepared in the same manner as in the working example 1 except that a powder of silicon (Si) and lithium silicate ($SiO_2/Li_2O=2$) were used instead of a mixed powder of a powder of silicon (Si) and a powder of silicon dioxide ($SiO_2$) as a raw material for generating silicon monoxide (SiO) gas, and the pulverization characteristics of the silicon-based active material precursor powder and the electrode characteristics of the silicon-based active material powder were measured. The measurement results were as shown in Table 1. The silicon monoxide thin coating obtained in this example contains lithium. Also in this working example, a negative electrode was prepared in the same manner as in the working example 1, and the negative electrode was imaged by a scanning electron microscope (SEM), and it was confirmed from the image that the silicon-based active material particles in the silicon-based active material powder had a layer structure, and that the thickness of each layer was 0.2 μm or less.

Working Example 9

A silicon-based active material powder was prepared in the same manner as in the working example 8 except that the rotation speed of the vapor deposition drum 130 was adjusted so that the deposition thickness of silicon monoxide became 0.98 μm, and the pulverization characteristics of the silicon-based active material precursor powder and the electrode characteristics of the silicon-based active material powder were measured in the same manner as in the working example 1. The measurement results were as shown in Table 1. Also in this working example, a negative electrode was prepared in the same manner as in the working example 1, and the negative electrode was imaged by a scanning electron microscope (SEM), and it was confirmed from the image that the silicon-based active material particles in the silicon-based active material powder had a layer structure, and that the thickness of each layer was 1 μm or less.

Working Example 10

A silicon-based active material powder was prepared in the same manner as in the working example 8 except that the rotation speed of the vapor deposition drum 130 was adjusted so that the deposition thickness of silicon monoxide became 0.48 μm, and the pulverization characteristics of the silicon-based active material precursor powder and the electrode characteristics of the silicon-based active material powder were measured in the same manner as in the working example 1. The measurement results were as shown in Table 1. Also in this working example, a negative electrode was prepared in the same manner as in the working example 1, and the negative electrode was imaged by a scanning electron microscope (SEM), and it was confirmed from the image that the silicon-based active material particles in the silicon-based active material powder had a layer structure, and that the thickness of each layer was 0.5 μm or less.

Working Example 11

A silicon-based active material powder was prepared in the same manner as in the working example 8 except that the rotation speed of the vapor deposition drum 130 was adjusted so that the deposition thickness of silicon monoxide became 0.08 μm, and the pulverization characteristics of the silicon-based active material precursor powder and the electrode characteristics of the silicon-based active material powder were measured in the same manner as in the working example 1. The measurement results were as shown in Table 1. Also in this working example, a negative electrode was prepared in the same manner as in the working example 1, and the negative electrode was imaged by a scanning electron microscope (SEM), and it was confirmed from the image that the silicon-based active material particles in the silicon-based active material powder had a layer structure, and that the thickness of each layer was 0.1 μm or less.

Working Example 12

A silicon-based active material powder was prepared in the same manner as in the working example 8 except that the rotation speed of the vapor deposition drum 130 was adjusted so that the deposition thickness of silicon monoxide became about 0.05 μm, and the pulverization characteristics of the silicon-based active material precursor powder and the electrode characteristics of the silicon-based active material powder were measured in the same manner as in the working example 1. The measurement results were as shown in Table 1. Also in this working example, a negative electrode was prepared in the same manner as in the working example 1, and the negative electrode was imaged by a scanning electron microscope (SEM), and it was confirmed from the image that the silicon-based active material particles in the silicon-based active material powder had a layer structure, and the thickness of each layer was about 0.05 μm.

Working Example 13

A silicon-based active material powder was prepared in the same manner as in the working example 8 except that the rotation speed of the vapor deposition drum 130 was adjusted so that the deposition thickness of silicon monoxide became about 0.02 μm, and the pulverization characteristics of the silicon-based active material precursor powder and the electrode characteristics of the silicon-based active material powder were measured in the same manner as in the working example 1. The measurement results were as shown in Table 1. Also in this working example, a negative electrode was prepared in the same manner as in the working example 1, and the negative electrode was imaged by a scanning electron microscope (SEM), and it was confirmed from the image that the silicon-based active material particles in the silicon-based active material powder had a layer structure, and the thickness of each layer was about 0.02 μm.

Working Example 14

A silicon-based active material powder was prepared in the same manner as in the working example 8 except that the rotation speed of the vapor deposition drum 130 was adjusted so that the deposition thickness of silicon monoxide became about 0.01 μm, and the pulverization characteristics of the silicon-based active material precursor powder and the electrode characteristics of the silicon-based active material powder were measured in the same manner as in the working example 1. The measurement results were as shown in Table 1. Also in this working example, a negative electrode was prepared in the same manner as in the working example 1, and the negative electrode was imaged by a scanning electron microscope (SEM), and it was confirmed from the image that the silicon-based active material particles in the silicon-based active material powder had a layer structure, and the thickness of each layer was about 0.01 μm.

Comparative Example 1

A silicon-based active material powder was prepared in the same manner as in the working example 1 except that a silicon monoxide thin coating obtained by condensing and depositing the silicon monoxide gas without rotating the vapor deposition drum 130 was scraped off by a scraper 141 to obtain a silicon monoxide powder, and the silicon monoxide powder was pulverized by a dry attritor until the mean particle diameter D50 became 5 μm to obtain silicon-based active material particles, and the pulverization characteristics of the silicon-based active material precursor powder and the electrode characteristics of the silicon-based active material powder were measured. The measurement results were as shown in Table 1. Also in this comparative example, a negative electrode was prepared in the same manner as in the working example 1, and the negative electrode was imaged by a scanning electron microscope (SEM). The imaging results are shown in FIG. 6 to FIG. 9. In particular, it was confirmed from the images shown in FIGS. 8 and 9 that the silicon-based active material particles in the silicon-based active material powder did not have a layer structure.

Comparative Example 2

A silicon-based active material powder was prepared in the same manner as in the working example 8 except that a silicon monoxide thin coating obtained by condensing and depositing the silicon monoxide gas without rotating the vapor deposition drum 130 was scraped off by a scraper 141 to obtain a silicon monoxide powder, and the silicon monoxide powder was pulverized by a dry attritor until the mean particle diameter D50 became 5 μm to obtain silicon-based active material particles, the pulverization characteristics of the silicon-based active material precursor powder and the electrode characteristics of the silicon-based active material powder were measured. The measurement results were as shown in Table 1. The silicon monoxide thin coating obtained in this comparative example contains lithium. Also in this comparative example, a negative electrode was prepared in the same manner as in the working example 1, and the negative electrode was imaged by a scanning electron microscope (SEM), but it was confirmed from the image that the silicon-based active material particles in the silicon-based active material powder did not have a layer structure.

ing the negative electrode active material is thinner, the output characteristics thereof are improved.

Further, as is apparent from Table 1, all of the silicon-based active material precursor powders according to the working examples 8 to 14 were found to have a smaller average particle size of the pulverized sample after pulverization for 5 minutes and excellent pulverization properties than the silicon-based active material precursor powder according to the comparative example 2. In addition, in the silicon-based active material precursor powders according to the working examples 8 to 14, it was clarified that the pulverization property of the silicon-based active material precursor powder was higher as the thickness of the layer was thinner. Furthermore, it was found that the coin cells according to the working examples 8 to 14 were superior in output characteristics to the coil cells according to the

TABLE 1

| | Particle characteristics | | | Battery characteristics | | | |
| --- | --- | --- | --- | --- | --- | --- | --- |
| | Presence or absence of Lithium | Pulverization diameter after 5 minutes (mm) | Thickness of layer (mm) | Initial charge capacity (mAh/g) | Initial discharge capacity (mAh/g) | Initial efficiency (%) | output characteristics (%) |
| Working example 1 | Absence | 7.5 | 0.2 | 2601 | 1839 | 70.7 | 95.1 |
| Working example 2 | Absence | 10.0 | 1 | 2465 | 1550 | 62.9 | 94.5 |
| Working example 3 | Absence | 10.0 | 0.6 | 2543 | 1701 | 66.9 | 94.6 |
| Working example 4 | Absence | 6.2 | 0.1 | 2580 | 1820 | 70.5 | 96.5 |
| Working example 5 | Absence | 5.7 | 0.05 | 2574 | 1812 | 70.4 | 97.4 |
| Working example 6 | Absence | 5.5 | 0.02 | 2562 | 1799 | 70.2 | 98.3 |
| Working example 7 | absence | 5.3 | 0.01 | 2551 | 1789 | 70.1 | 99.1 |
| Working exsmple 8 | Presence | 7.7 | 0.2 | 1831 | 1470 | 80.3 | 97.1 |
| Working example 9 | Presence | 9.2 | 1 | 1795 | 1320 | 73.5 | 96.3 |
| Working example 10 | Presence | 8.6 | 0.5 | 1867 | 1401 | 75.4 | 96.3 |
| Working example 11 | Presence | 6.8 | 0.1 | 1811 | 1452 | 80.2 | 97.9 |
| Working example 12 | presence | 5.8 | 0.05 | 1808 | 1444 | 80.1 | 98.3 |
| Working example 13 | Presence | 5.6 | 0.02 | 1796 | 1438 | 80.1 | 99.2 |
| Working example 14 | Presence | 5.5 | 0.01 | 1790 | 1433 | 80.1 | 99.5 |
| Comparative example 1 | Absence | 10.1 | — | 2650 | 1874 | 70.7 | 94.3 |
| Comparative example 2 | presence | 10.5 | — | 1902 | 1466 | 77.1 | 96.2 |

TABLE 2

| | In charging | In discharging |
| --- | --- | --- |
| Initial time | CC—CV 0.1 C 5 mV—0.01 C | CC 0.1 C 1.5 V cut-off |
| Second time | CC—CV 0.3 C 5 mV—0.01 C | CC 0.3 C 1.5 V cut-off |
| Third time | CC—CV 0.5 C 5 mV—0.01 C | CC 0.5 C 1.5 V cut-off |

SUMMARY

As is apparent from Table 1, all of the silicon-based active material precursor powders according to the working examples 1 to 7 were found to have a smaller average particle size of the pulverized sample after pulverization for 5 minutes and excellent pulverization properties than the silicon-based active material precursor powder according to the comparative example 1. In addition, in the silicon-based active material precursor powders according to the working examples 1 to 7, it was clarified that the pulverization property of the silicon-based active material precursor powders was higher as the thickness of the layer was thinner. Furthermore, it was found that the coin cells according to the working examples 1 to 7 were superior in output characteristics to the coil cells according to the comparative example 1. Further, in the coin cells according to the working examples 1 to 7, it was clarified that as the thickness of the layer in the silicon-based active material particles constitutcomparative example 2. Further, in the coin cells according to the working examples 8 to 14, it was clarified that as the thickness of the layer in the silicon-based active material particles constituting the negative electrode active material is thinner, the output characteristics thereof are improved.

The invention claimed is:

1. A method for producing a silicon-based active material precursor particle, comprising:

a laminated coating forming step for forming a laminated coating of a silicon-based active material on a rotating body having a horizontal axis by repeating a vapor deposition step for depositing a silicon-based active material forming material on the rotating body to form the silicon-based active material forming material having a multilayer structure, a scraping step for scraping off the laminated coating of the silicon-based active material from the rotating body after repeating the vapor deposition step to obtain the silicon-based active material precursor particle having the multilayer structure as a part thereof.

2. The method for producing a silicon-based active material precursor particle according to claim 1, wherein the rotating body is movable with respect to the supply path of the silicon-based active material for repeating the vapor deposition step.

* * * * *